Jan. 7, 1969  L. A. COLLINS  3,420,093
METHOD AND APPARATUS FOR TESTING CORE PERMEABILITY
Filed Aug. 3, 1966
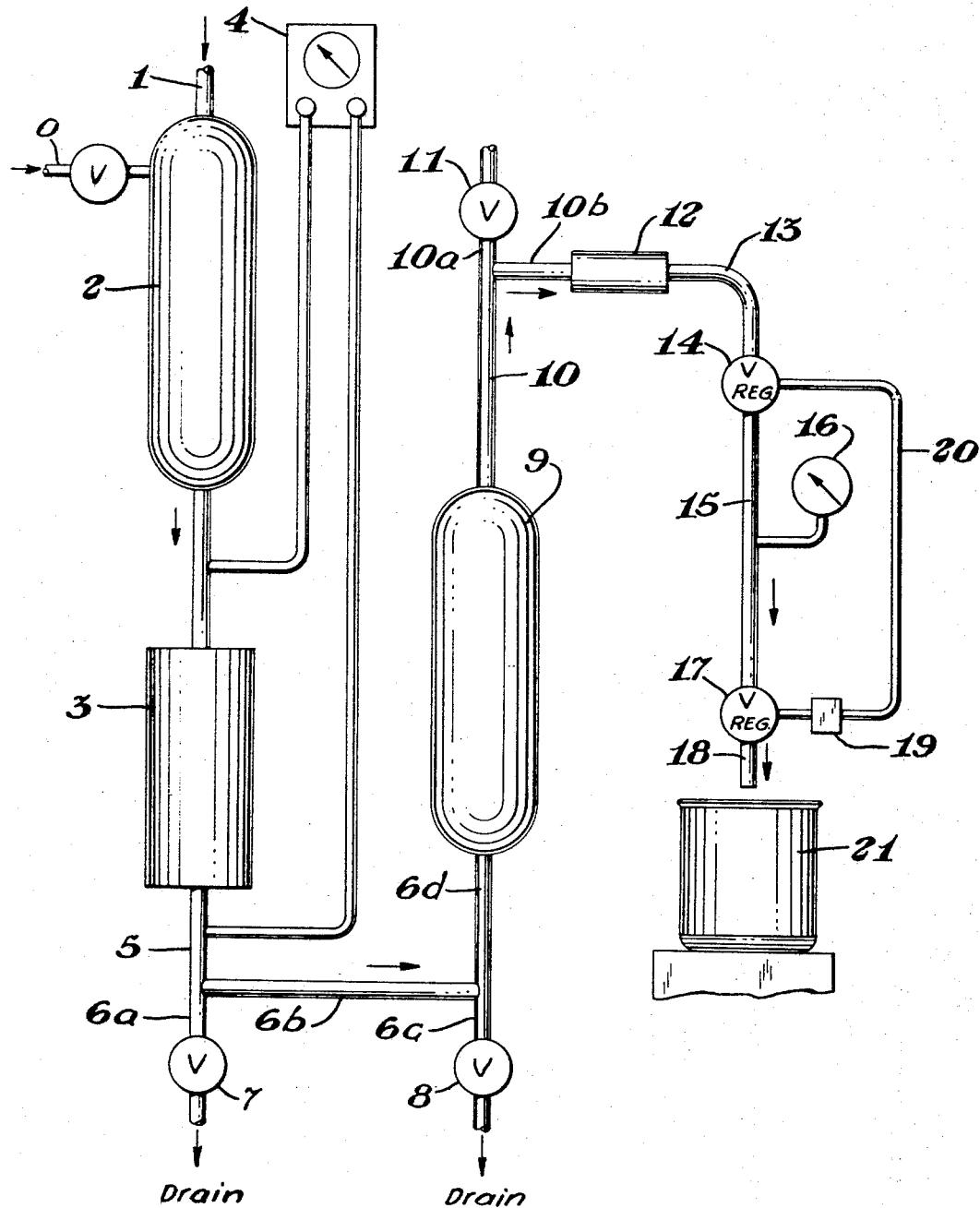
INVENTOR.
Leon A. Collins
BY
ATTORNEY

United States Patent Office 3,420,093
Patented Jan. 7, 1969

3,420,093
METHOD AND APPARATUS FOR TESTING CORE PERMEABILITY
Leon A. Collins, Norman, Okla., assignor to The Dow Chemical Company, Midland, Mich., a corporation of Delaware
Filed Aug. 3, 1966, Ser. No. 570,051
U.S. Cl. 73—38                10 Claims
Int. Cl. G01m *3/00;* G01m *3/26*

ABSTRACT OF THE DISCLOSURE

An apparatus and method of use thereof whereby the pressure gradient is immediately varied in the exact proportion to any decrease or increase in the permeability, of a test sample, thereby to maintain a truly constant rate of flow. The invention is especially adaptable to studying the effect on permeability of a rock core while it is being subjected to the action of a fluid which is reactive therewith or which otherwise tends to change the permeability thereof as by either plugging or opening existing channels.

---

The invention relates to an improved testing apparatus for and method of ascertaining the permeability of an earthen or rock geologic formation. More particularly, the invention is a testing apparatus and method that measures the change in permeability of an earthen or rock formation, by injecting into a sample core thereof, a treating fluid and measuring the change in permeability of the core during such injection.

In exploring subterranean formations to locate fluids therein, in drilling wells into such formations, and, prior to treating such formations to improve production of fluid therefrom, it has been common practice to attempt to ascertain the permeability of the formation concerned. Such attempts have generally entailed obtention of sample cores and subjecting such cores to tests under more-or-less standardized conditions to obtain a permeability value.

Permeability is normally measured in millidarcys or darcys. A darcy (named after Henry d'Arcy) may be defined as the rate of flow in milliliters per second of a fluid, having an adjusted viscosity of one centipoise, through a cross-section of a one square centimeter specimen of material, e.g., rock having some permeability, under a pressure gradient of one atmosphere (760 millimeters of mercury) per centimeter of length of the specimen.

The formula employed may be expressed as follows:

(1) $$Q = \frac{KA\Delta P}{\mu L}$$

or (2) $$K = \frac{Q\mu L}{A\Delta P}$$

wherein

Q = flow rate in milliliters per second,
K = permeability in darcys,
A = cross-sectional area of core in cm.$^2$,
$\Delta P$ = pressure gradient in atmospheres,
L = length of core in centimeters,
$\mu$ = viscosity of fluid employed in test.

The permeability (K) is accordingly measured by ascertaining the flow rate (Q) at a given pressure drop per unit length of core ($\Delta P/L$), of a selected test fluid. These data, together with the known viscosity ($\mu$) of the fluid and the cross sectional area of the core (A), are substituted in the above equation to obtain the permeability (K).

A measure of permeability of a solid material may be obtained by maintaining a constant pressure drop or gradient, as nearly as possible, and measuring the rate of flow. However, best results are obtained by maintaining the rate of flow of the test fluid through the test core as nearly constant as possible, throughout the test period, and measuring the pressure gradient. This latter objective has been difficult to attain because the rate of flow tends to vary during the test due to variations in resistance to flow therethrough which a test core exhibits as a result of the effect of the fluid itself already in the core after the test has been started.

This condition becomes very markedly pronounced when a fluid is employed which chemically reacts with a component of the test core, as for example, (1) when employing an acidizing liquid which is expected to increase the permeability or (2) when employing a fluid which causes sloughing or heaving of a clay-containing core or a fluid that contains a fluid-loss control agent that may impair or lessen the permeability as the test progresses. To maintain flow at a truly constant rate would require some sort of prior knowledge as to the exact time and extent of successive changes within the core that affect the resistance to flow therethrough.

Since the change in permeability and particularly the extent and rate of change are not predictable, obtaining a truly constant rate of flow by adjusting the pressure to compensate for resistance to flow through the test core is not plausible.

Permeability values, wherein a change in permeability is anticipated, are usually plotted as millidarcys against time in order to show the true permeability profile as opposed to an instantaneous reading, which might well be misleading, even when substantially pure water or an inert gas is used as the test fluid, and would be of no appreciable value when a change in permeability is to be measured. Heretofore, permeability curves have shown wide irregularities in the rate of flow of fluid flowing from a test core, even though compensation in the pressure being applied to the fluid entering the core is promptly attempted from observed changes in the rate of flow from the core.

There is, accordingly, an existing need for a way of maintaining a constant rate of flow for an adequate period of time through a test core to give reliable permeability values, particularly when a test fluid is employed which effectuates a progressive change in the permeability of the core. The invention meets this need by providing an apparatus and a method of testing cores that enable those concerned with obtaining accurate permeability readings to achieve this end. More specifically, the invention provides an apparatus and method of use thereof whereby the pressure gradient ($\Delta P$) is immediately varied in the exact proportion to any decrease or increase in the permeability (K), thereby to maintain a truly constant rate of flow. The invention is especially adaptable to studying the effect on permeability of materials while being subjected to the action of a fluid reactive therewith or which otherwise tends to change the permeability as by plugging existing channels.

The apparatus provides a system which permits a high pressure to be applied to the test fluid entering the core, e.g., one of the two or three thousand p.s.i.g., if the material of apparatus is sufficiently strong (although a pressure of a few hundred to 1,000 p.s.i.g. is usually quite adequate) but which, through the instrumentality of a pressure relief valve, steps down the pressure exerted by the effluent fluid to only slightly greater than atmospheric so that a relatively slow flow of effluent fluid from the system is maintained.

The annexed drawing illustrates, in a schematic sketch, the apparatus of the invention whereon the various elements are identified by the following numerals: 1 is an inlet pipe leading from a source of gas under pressure, e.g., nitrogen; 2 is a chamber which provides a reservoir for test fluid to be used and also serves as a receiving chamber for the gas under pressure; O is an inlet assembly in said chamber through which the testing liquid is introduced; 3 is a Hassler sleeve containing a core of a solid to be tested positioned axially in the Hassler sleeve, the entrance being at the top leading into the upper end of the core and the outlet being at the bottom leading from the core; 4 is a gauge and instrument for recording the pressure between the entrance and the outlet of the Hassler sleeve, thereby registering and recording the pressure differential between a fluid entering and that leaving said core; 5 is a flow line leading from the Hassler sleeve, bifurcating into line 6a leading to drain line 7, for cleaning and flushing purposes, and line 6b which again bifurcates into line 6c leading to drain valve 8 and line 6d leading effluent test fluid from the Hassler sleeve on its continuing course through the apparatus; 9 is a reservoir containing a low-viscosity liquid which is immiscible with the test fluid (e.g., a lubricating oil of relatively low S.A.E. number when the test fluid is aqueous) and which receives from line 6d the effluent test fluid from the core which displaces upwardly the low viscosity immiscible liquid; 10 is an outlet line for the so displaced immiscible liquid and which bifurcates into line 10a leading to valve 11 (for filling and flushing purposes) and line 10b leading the immiscible fluid from reservoir 9 to filter 12; line 13 leads the immiscible liquid from the filter; 14 is a pressure regulating valve for the immiscible liquid; 15 is a line leading said liquid from the pressure regulating valve; 16 is a gauge which registers the pressure of the immiscible liquid in line 15; 17 is a flow control valve which may be preset to permit the passage, into exit line 18, of a predetermined amount of the immiscible liquid at a fixed number of milliliters per second, and which, as illustrated, may be made to cooperate with gas-operated diaphragm regulator 19 to open or close, automatically, pressure relief valve 14 by means of connecting gas line 20; 21 is a receptacle for effluent immiscible liquid (displaced from reservoir 9).

It is to be understood that the coorperation between flow control valve 17 and pressure relief valve 14, for example by effecting a pressure diaphragm regulator 19 which actuates pressure control valve 14, as illustrated, is but a refinement of the instrument and is not essential. It is only necessary that the desired rate of flow out of line 18 be determined and valve 14 then be preset at a fixed pressure to maintain this flow.

It is to be understood that the principle of the invention may be applied to an apparatus and method whereby the objectives of a constant flow of fluid through a core being tested may be provided wherein modifications therein may be made of the nature of those apparent to those skilled in the art. For example, when a noncorrosive test fluid is employed, the immiscible lower-density fluid need not be provided.

The apparatus of the invention permits the use of a corrosive acidic composition as the test fluid whereby its rate of attack can be evaluated as a function of increased permeability of the core being tested but which corrosive composition will be exchanged in chamber 9 for a noncorrosive oil which will not damage the finely machined valves 14 and 17 and which oil is of a relatively low density and of a constant and relatively low viscosity.

Illustrative of a valve suitable for pressure relief valve 14 is that known as Standard Pneumatic Model LGV-100 Stainless Steel, available from the Ben McKalip Co. This valve is adaptable for use with either gas or liquid and is fully automatic for adjustment to the desired pressure applied to the fluid in line 15.

A Hassler sleeve is a well known device which accommodates a cylindrical shaped core in a flexible envelope which is subjected to lateral or radial pressure sufficient to permit passage of fluid through the core axially only, that is, from end to end. If preferred an obvious equivalent for the Hassler sleeve might be used to attain substantially the same objective. Hassler sleeves or the equivalent are described in the literature, e.g., in Oil Reservoir Engineering by Pirson, pages 74 to 77 inclusive, published by McGraw-Hill (1958) and in U.S. patent, e.g., Hassler U.S. Patent 2,345,935.

When practicing the invention employing that embodiment of the apparatus of the invention wherein no automatic cooperating means between the flow control valve 17 and pressure relief valve 14, is provided, valve 14 is preset to maintain a steady pressure which will permit fluid to pass into line 15 at a fixed rate of flow.

When practicing the invention employing an apparatus wherein a cooperating means between valve 17 and valve 14 is provided, valve 17 is preset to permit a desired rate of flow and which in turn automatically actuates valve 14 to insure the pressure necessary in line 15 to maintain the desired flow at a constant rate. The latter alternative provides easier operation in that any reasonable flow may be started and the rate of flow timed as desired. The pressure relief valve thereafter automatically will provide the exact pressure necessary to maintain the flow at the desired constant rate.

In either instance, the pressure differential across the core being tested will register at gauge 4. The greater the permeability of the core, the less will be the pressure differential and contrariwise, the less the permeability of the core, the greater will be the pressure differential across the core. Accordingly, the registered pressure differential on gauge 4, when supplied as the $\Delta P$ value in the preceding formula, permits calculation of the permeability (K) in darcys. A progressive change brought about in the core will result in a series of $\Delta P$ readings which, when tabulated or graphed, present a concise and very useful time record of the changes in permeability.

The following examples illustrate the practice of the invention, reference being made to the apparatus shown in the annexed drawing.

Sandstone cores containing limestone striations were selected for testing. The cores were 7.62 centimeters long and 5 square centimeters in cross-section. The tests were conducted as follows:

A core to be tested was placed in Hassler sleeve 3.

Reservoir 9 was filled through valve 11 with a hydrocarbon oil having a viscosity of 1 centipoise. Valve 11 was then closed. Flow control valve 17 was set to maintain a fixed rate of flow therethrough.

Example 1

To obtain the permeability of the core, unaffected by the test fluid employed, chamber 2 was substantially filled through inlet assembly O with a standard API NaCl brine. The rate of flow of displaced oil from the apparatus through valve 17 was preset at 5 centimeters per minute. Nitrogen gas was introduced through line 1 at a measured pressure of 320 p.s.i.g. The pressure differential, as registered on gauge 4, showed 90 p.s.i. and remained substantially constant during a test period of 28 minutes. The pressure differential and the other known values were substituted in Formula 2 hereinabove. K was calculated and found to be 22.5 millidarcys or 0.0225 darcy.

For comparative purposes, an identical core was tested by employing a conventional Klinkenberg Permeability apparatus. Operating that apparatus in the conventional manner, and as directed by recommended procedure, the rate of flow was started at 10 milliliters per minute. However, within a very short time and without warning, the rate jumped to 12.5 milliliters per minute. The pressure on the fluid entering the core being tested was then manually reduced. As a result thereof the rate of flow of effluent liquid dropped to below 10. The flow rate thereafter fluctuated repeatedly despite careful efforts to maintain it at 10 milliliters per minute by compensating adjustments of the pressure on the core being tested. An inaccurate average K value of approximately 0.010 darcy was obtained.

The brine was replaced in the apparatus of the invention by a 15% aqueous solution of HCl containing about 0.7% of a corrosion inhibitor and about 3% HF. The HF in the acidizing fluid attacks the sandstone core, increasing the permeability thereof.

The experiment was repeated except that the nitrogen pressure on the test acid was 320 p.s.i.g. The results, including the calculated permeability (K) according to Formula 2 hereinabove, are shown in Table I below. The permeability values (K) were obtained by substituting the following values in Formula 2 supra:

Q=Milliliters per minute through valve 17 of 4.7 to 5,
A=5 square centimeters,
L=7.62 centimeters,
ΔP=Pressure gradient through core,
μ=viscosity of 1 centipoise,
K=calculated permeability in darcys.

TABLE I

| Time in minutes from start of experiment | Pressure differential in p.s.i.g. at gauge 4 | Flow rate in in cc./minutes | Permeability (K) in millidarcies |
| --- | --- | --- | --- |
| 11 | 110 | 4.7 | 17.4 |
| 35 | 107 | 4.8 | 17.9 |
| 43 | 92 | 4.8 | 20.8 |
| 49 | 77 | 4.7 | 24.8 |
| 54 | 65 | 4.9 | 29.4 |
| 60 | 57 | 4.7 | 33.6 |
| 65 | 52 | 5.0 | 36.8 |
| 71 | 47 | 4.8 | 40.7 |
| 76 | 45 | 4.8 | 42.5 |

Reference to the table shows that when the rate of flow from the apparatus was set and maintained between 4.7 and 5 for a period of 76 minutes and the pressure on the test acid maintained at 230 p.s.i.g., the effluent pressure of the test acid decreased, as shown by the increased recorded pressure differential. Accordingly, the permeability is shown to have gradually increased, evincing the efficacy of the acid on the sandstone cores.

When the pressure gradient or differential (ΔP) value is plotted against the rate of effluent flow (Q) value, a straight smooth line results from the practice of the invention whereas when convention techniques are employed, the relationship between pressure differential and rate of flow is comparatively erratic and an irregular plotted line results.

By plotting the K values of Table I against time during which the acidic fluid was passed through the core, an informative profile is made which gives a clear picture of the effect of the injected fluid on permeability of the core sample.

Reference to the example and comparative runs show very definitely the dependability, accuracy, and operational advantages of the apparatus and method of the invention in contrast to the inaccuracy, undependability, and inconvenience of conventional practice.

Having described my invention, what I claim and desire to protect by Letters Patent is:

1. The apparatus for continuously measuring permeability of solid material having some permeability while the solid material is undergoing a permeability change comprising: a means for providing pressurized gas; a chamber for a supply of test fluid having connection with said gas supply; a confining sleeve in series with said chamber into which an elongated solid core of the material to be tested is axially positioned whereby test fluid is caused to enter one end of said core and pass out the opposite end thereof; a means to measure the pressure gradient of said fluid flowing from end to end through the core in said sleeve which is suitably connected to an inlet line leading into and an outlet line leading from said sleeve; a pressure regulating valve, in series with the effluent fluid from said core, which controls the pressure exerted by the effluent test fluid to provide a substantially constant flow of liquid flowing through said valve.

2. The apparatus of claim 1, wherein said confining sleeve is a Hassler sleeve.

3. The apparatus of claim 2, wherein there is provided, between the outlet of the Hassler sleeve and said pressure regulating valve, a vertically positioned reservoir containing a fluid which is of stable viscosity and substantially immiscible with and of less density than said test liquid, having an inlet at the bottom thereof through which effluent test fluid enters and an outlet at the top thereof out through which immiscible fluid is displaced by the test fluid said immiscible fluid being forced through said regulating valve under a predetermined constant pressure.

4. The apparatus of claim 2, wherein a filter is positioned between the outlet of the Hassler sleeve and said pressure regulating valve.

5. The apparatus of claim 2, wherein there is provided a constant rate flow control valve through which fluid from said pressure regulating valve must pass, said flow control valve being connected through an actuating means with said pressure regulating valve thereby automatically to adjust said pressure regulating valve to decrease or increase the pressure on liquid passing therethrough in inverse relationship to the rate of flow through said flow control valve thereby to compensate for any tendency of the rate of flow to increase or decrease.

6. The method of continuously measuring in darcys, the permeability (K) of a solid material being subjected to the action of a fluid which effectuates changes in permeability of said solid material which comprises:
   (1) obtaining an elongated specimen of said material of known cross-sectional area (A) and length (L);
   (2) positioning said specimen in a plastic sleeve, confined within a reinforcing shell, which prevents passage of fluid along the circumferential periphery of said specimen and provides ingress of fluid into one end of said specimen and egress of the fluid from the other end thereof;
   (3) providing a source of test fluid of known viscosity ($\mu$) which effectuates changes in permeability of said solid material and a means for pressurizing said fluid to force it into and through said specimen;
   (4) registering changes in the pressure gradient of the test fluid across said specimen, designated ΔP;
   (5) positioning a pressure control valve in series with said specimen thereby to control the pressure exerted by effluent test fluid at the location of said pressure control valve to provide and maintain a substantially constant flow of fluid (Q) from said valve;
   (6) calculating the permeability (K) in darcys at intervals over a period of time according to the following formula: $K = Q\mu L / A \Delta P$, wherein Q is the substantially constant rate of flow in milliliters per minute from said pressure regulating value, $\mu$ is the viscosity of the liquid passing through said regulating value, L is the length of the specimen in centimeters, A is the cross-sectional area of the specimen in square centimeters, ΔP is the pressure gradient across the specimen in atmospheres;
   (7) taking a series of readings of ΔP to establish a trend in permeability changes effectuated by passage of the test fluid through the core.

7. The method according to claim 6, wherein a permeability profile is composed essentially of a series of K values plotted against time intervals thereby to pictorially present the progressive effect of a test fluid on a specimen of solid material being tested.

8. The method according to claim 6, wherein a body of fluid of substantially constant and known viscosity and of less density than, and substantially immiscible with, said test fluid is positioned in the path of the effluent test fluid between said specimen and said regulating valve whereby at least a portion of said body of substantially immiscible fluid is displaced by the effluent test fluid and caused to pass through said regulating valve thereby transmitting the pressure of the effluent test fluid to the pressure regulating valve and providing a substantially constant rate of flow of said immiscible fluid through said regulating valve.

9. The method according to claim 6, wherein a constant rate of flow of liquid through said specimen is maintained by providing a constant rate flow control valve in cooperation with said pressure regulating valve whereby any tendency of change in the rate of flow is automatically compensated by activation of a control means which inversely adjusts the pressure of fluid passing through said regulating valve to maintain the constant rate of flow.

10. The method according to claim 6, wherein the effluent from said specimen is filtered prior to actuating said flow control valve.

References Cited
UNITED STATES PATENTS

| | | | |
|---|---|---|---|
| 2,599,742 | 6/1952 | Boucher et al. | 73—38 |
| 2,737,809 | 3/1956 | Herzog et al. | 73—38 |

S. CLEMENT SWISHER, *Primary Examiner.*

W. HENRY, *Assistant Examiner.*